(12) United States Patent
Covington et al.

(10) Patent No.: US 7,965,702 B2
(45) Date of Patent: Jun. 21, 2011

(54) RELIABLE REPORTING OF LOCATION DATA

(75) Inventors: Michael J. Covington, Hillsboro, OR (US); Manoj R. Sastry, Portland, OR (US); Farid Adrangi, Lake Oswego, OR (US); Deepak J. Manohar, Redmond, WA (US); Shao-Cheng Wang, Los Angeles, CA (US)

(73) Assignee: Intel Corporation, Santa Clara, CA (US)

( * ) Notice: Subject to any disclaimer, the term of this patent is extended or adjusted under 35 U.S.C. 154(b) by 1424 days.

(21) Appl. No.: 11/368,374

(22) Filed: Mar. 3, 2006

(65) Prior Publication Data

US 2007/0153715 A1    Jul. 5, 2007

Related U.S. Application Data

(63) Continuation-in-part of application No. 11/322,683, filed on Dec. 30, 2005.

(51) Int. Cl.
*H04L 12/66* (2006.01)
*G06F 7/04* (2006.01)
*G06F 9/455* (2006.01)

(52) U.S. Cl. .............................. 370/352; 726/27; 718/1

(58) Field of Classification Search .......... 370/352–356; 379/142.1, 207.12, 45; 726/28–30; 455/404.2, 455/456.1
See application file for complete search history.

(56) References Cited

U.S. PATENT DOCUMENTS

| | | | | |
|---|---|---|---|---|
| 2002/0046353 | A1* | 4/2002 | Kishimoto | 713/202 |
| 2003/0023726 | A1* | 1/2003 | Rice et al. | 709/225 |
| 2003/0225893 | A1* | 12/2003 | Roese et al. | 709/227 |
| 2004/0008666 | A1* | 1/2004 | Hardjono | 370/352 |
| 2004/0120473 | A1* | 6/2004 | Birch et al. | 379/88.17 |
| 2006/0293024 | A1* | 12/2006 | Benco et al. | 455/404.2 |

OTHER PUBLICATIONS

United States Patent Application, pending, not yet published, U.S. Appl. No. 11/322,683, filed Dec. 30, 2005 to Manoj Sastry.
R. Sailer et al., "Building a MAC-Based Security Architecture for the Xen Open-Source Hypervisor", IBM T.J. Watson Research Center, Hawthorne, New York, 10 pps.
Intel Corporation, "LaGrande Technology Architectural Overview", Sep. 2003, 10 pps.

(Continued)

*Primary Examiner* — Nathan Flynn
*Assistant Examiner* — Joel Hamel
(74) *Attorney, Agent, or Firm* — Schwabe, Williamson & Wyatt, P.C.

(57) ABSTRACT

A machine, such as a mobile device having telephony features, such as a voice over Internet Protocol (VoIP) telephony application, is configured with a secure environment in which a location provider within (more reliable) or external to (less reliable) the machine may determine location data for the machine and securely provide it to a telephony application program for incorporation into a call setup for calling a callee. The secure environment may be created through use of one or more of Intel's LaGrande Technology™ (LT), Vanderpool Technology (VT), or a Trusted Platform Module (TPM). The LT and VT allow defining secure independent components within the machine, such as by instantiating them as Virtual Machines, and the TPM allows components to cryptographically sign data, such as to facilitate ensuring the location data is not tampered with. A recipient of a telephone call setup including cryptographically secured location data may validate the location data and accept the call. Other embodiments may be described.

22 Claims, 4 Drawing Sheets

OTHER PUBLICATIONS

S. Bajikar, "Trusted Platform Module (TMP) based Security on Notebook PCs—White Paper", Intel Corporation, Jun. 20, 2002, 20 pps.
Xen Source, "Xen: Enterprse Grade Open Source Virtualization", Inside Xen 3.0, A XenSource White Paper, 5 pps.
J. Polk et al., "Session Initiation Protocol Location Conveyance", SIP Working Group, Internet Draft, Jul. 17, 2005, 66 pps.
Intel Corporation, "Intel Vanderpool Technology for la-32 Processors (VT-x) Preliminary Specification", Jan. 2005, 62 pps.

* cited by examiner

US 7,965,702 B2

RELIABLE REPORTING OF LOCATION DATA

RELATED APPLICATIONS

This application is a continuation in part of co-pending application Ser. No. 11/322,683, filed on Dec. 30, 2005, entitled "Method And System For Providing Security And Reliability To Collaborative Applications."

FIELD OF THE INVENTION

The invention generally relates to network based telephony applications such as the Voice over Internet Protocol (VoIP), and more particularly to providing a secure environment in which a location provider component can determine location data and securely hand it off to a telephony component without risk of tampering with the location data by other components of the environment.

BACKGROUND

With a traditional plain old telephone system (POTS), e.g., a wire line based telephone system, it was relatively easy to identify the location of a telephone engaging in a telephone call. A "911" service was created to allow simplified access to emergency services, where simply calling the number would route the caller to the geographically nearest emergency response center and provide the emergency response center with the name and address associated with the calling telephone.

With the advent of mobile telephony, such as cellular telephones, and network based telephony, such as VoIP through wired and wireless networks, area codes and telephone numbers are no longer bound to a particular physical location. The phrases "mobile telephony" and "mobile telephone" will be used to refer to telephony equipment, e.g., phones, computers, etc., not having a fixed location or address, including wireless equipment and equipment communicating over a wired network. Thus, when using mobile telephones, it is difficult to properly identify the source of a telephone call. For example, a wired based approach to identifying a cellular telephone based call may identify the source, e.g., physical location, of the land line used by the cellular telephone company to carry a cellular phone's call, and not the location of the cell phone itself. While some techniques have been created for locating the cellular phone with respect to the towers through with which it is communicating, e.g., triangulation techniques, for a VoIP telephone call, there is not even that option for trying to locate the physical location of a VoIP telephone.

Thus, with mobile telephony, when an emergency call is made to 911, the call will likely be routed to an incorrect emergency response center. Unfortunately, the error may not be minor, instead the call might be connected to a response center hundreds of miles away depending on how the telephone system identified the mobile telephone. In May 2005, however, the Federal Communications Commission (FCC) mandated that VoIP telephone companies provide an Enhanced 911 (E911) service that will provide a mobile telephone's identification and address information to a customer's local emergency response service. Unfortunately, to do so, telephony providers have statically assigned a customer's location information to their mobile telephones. This has a significant drawback because, as indicated above, the phones are mobile and thus may be calling from a location different from what was initially associated with the telephone.

BRIEF DESCRIPTION OF THE DRAWINGS

The features and advantages of the present invention will become apparent from the following detailed description of the present invention in which.

DETAILED DESCRIPTION

Figure 1:
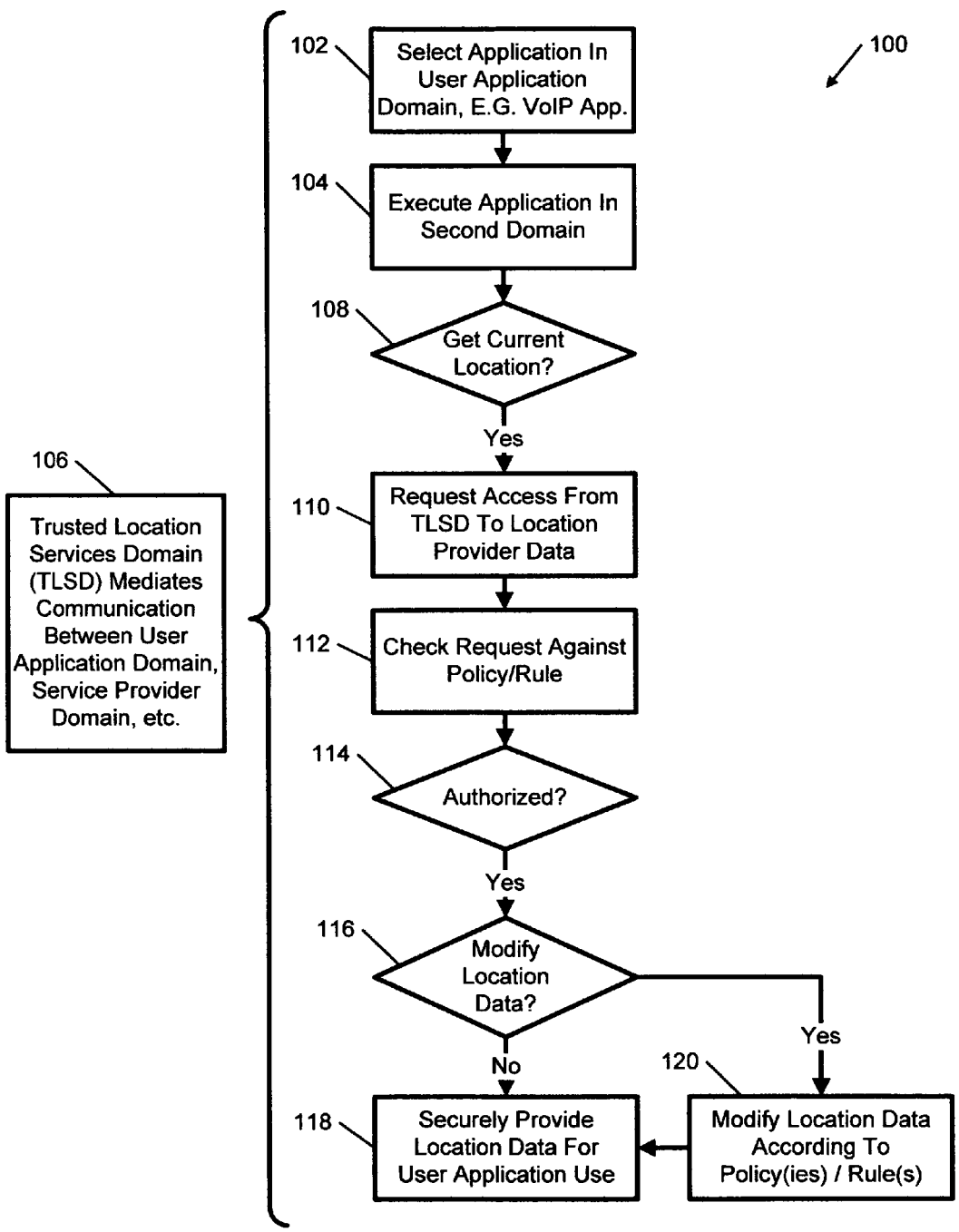
FIG. 1 illustrates a high-level data flow according to one embodiment for a platform having securely communicating domains to prevent tampering with data generated in one domain of the platform by another domain of the platform.

FIG. 1 illustrates a high-level data flow 100 according to one embodiment for a platform having securely communicating domains to prevent tampering with data generated in one domain of the platform by another domain of the platform. In various embodiments, domains may be implemented in combinations of virtual machines (VMs) utilizing secure communication channels to allow data transfers between domains without risk of tampering or corruption of, for example, data created in one domain by rogue hardware or software somewhere else within the platform.

As will be appreciated by one skilled in the art, VMs provide isolation between domains, allowing each domain to have as desired its own independent operating system, and also provide consolidation of domains that would have run on separate devices because the domains and their various application and operating system combinations may now run on a single platform. A monitoring component such as a Virtual Machine Manager (VMM) or Hypervisor (see FIG. 2 item 204 discussion below) is assumed to manage domain operation within the Virtual Machines (VMs), as one of ordinary skill in the relevant art would appreciate based at least on the teachings provided herein.

As illustrated, a user activates 102 a user application program such as a VoIP application program identified, for example, in a graphical user interface (GUI) of the platform. This triggers execution 104 of a VoIP application program within a service provider domain maintained by the service provider. As part of executing the application program, the VoIP application program communicates with a Trusted Location Services Domain (TLSD) (see FIG. 2 item 208), a domain managed by a platform administrator. The TLSD, as will be discussed in more detail below, mediates 106 requests between different domains for location data or other data available by domains of the platform. In this description and claims that follow, the phrase "domain mediator" is intended to represent operation of a TLSD or equivalent, and the phrase "location data" is intended to represent data to facilitate identifying where a particular event, such as placing a telephone call, is occurring. Typically location data would include a geographic reference such as by way of coordinates, but it will be appreciated location data may also or instead include data for identifying the source of a call, such as an identifier for a user placing a call, identifiers for switches or network routers/hubs through which a call is being placed, etc. If 108 the VoIP application wants to obtain current location information for the platform so that it may, for example, provide it along with a telephone call as caller-ID data, the VoIP application contacts 110 the TLSD seeking mediated access to a Trusted Location Provider, e.g., a component of the platform that has hardware or other access to hardware that can determine a current location for the platform.

The TLSD 112 compares the request for location data to rules or policies associated with the TLSD to determine if 114 the VoIP application is authorized to receive the data. If so, the TLSD checks 116 whether a rule or policy requires the location data to be modified before presenting to the VoIP application, such as to make the location data less specific, or to change it in some other way. For example, location data may be changed depending on where the VoIP application seeks to call, from where the call is being made, when the call is being made, etc. If 116 no alteration rule or policy applies, the location data is securely presented 118 to the VoIP application over a secure communication channel. The VoIP application may in turn use the data as needed. If 118 an alteration rule or policy applies, the location data is modified 122 accordingly before it is presented 118 to the VoIP application for its use.

Figure 2:
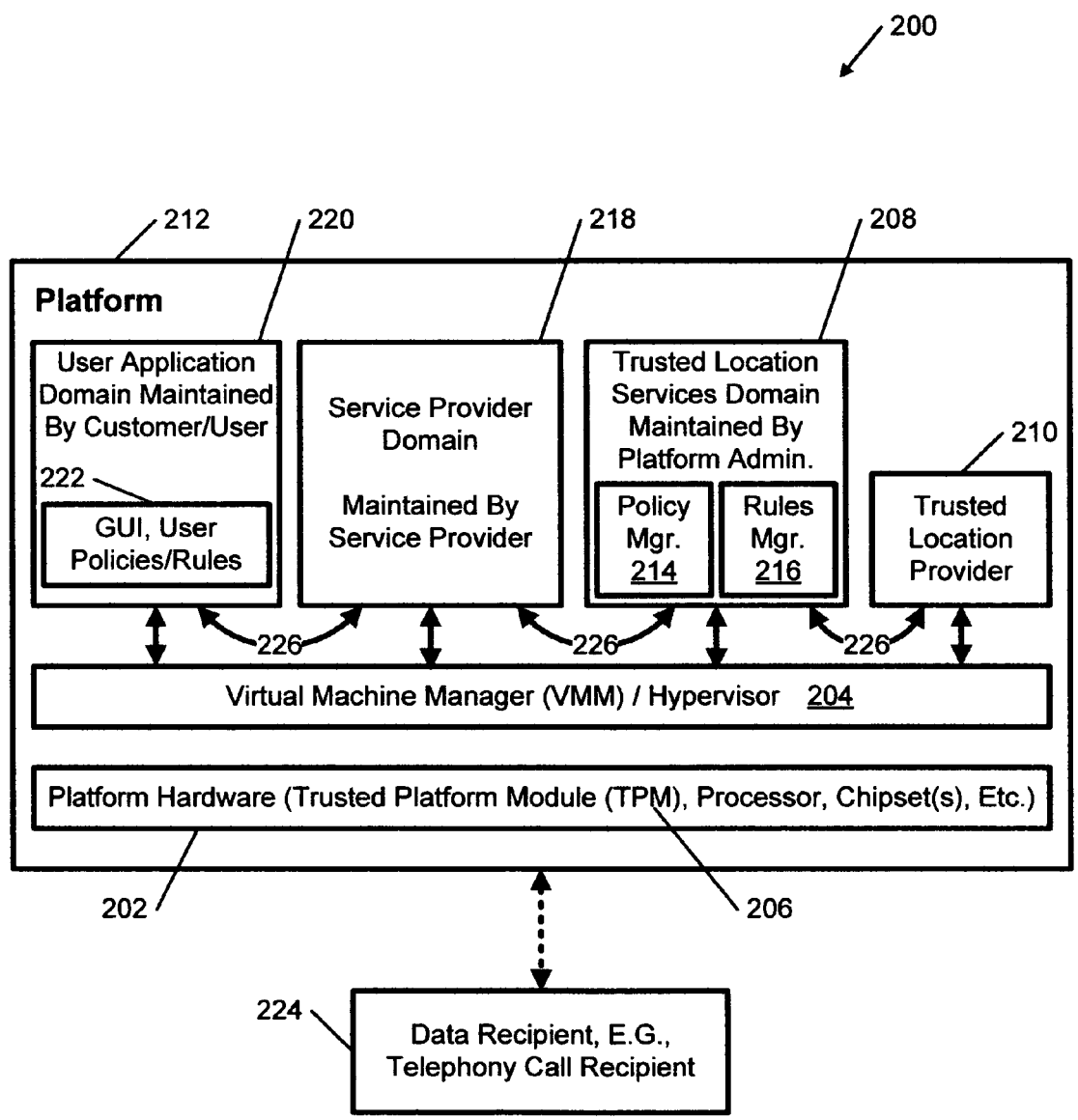
FIG. 2 illustrates a system according to one embodiment that may be used in lieu of assigning static location information to mobile telephony devices.

FIG. 2 illustrates a system 200 according to one embodiment that may be used in lieu of assigning static location information to mobile telephony devices. In the illustrated embodiment, current location information may be provided with respect to release policies or rules of a user utilizing a telephony device, e.g., restrictions on dissemination of information, granularity of information, etc., as well as with respect to policies or rules of a service provider managing the user's platform; indication of data reliability or security of information provided may also be provided with location data.

To ensure reliability in provided location, in the illustrated embodiment, it is assumed a telephony enabled device has a "trusted platform," meaning it has trusted platform hardware 202, 204 based security support, such as a platform using Intel's LaGrande Technology™ (LT) and Vanderpool Technology (VT). As understood by one skilled in the art, LT is part of a versatile set of client hardware enhancements to Intel processors, chipsets, and platforms that help protect the confidentiality and integrity of data stored or created on the client. LT describes a system architecture overlaying and extending virtual machine technology by permitting verifiably secure installation, launch and use of a secured Virtual Machine Monitor (VMM) or Hypervisor 204. As understood by one skilled in the art, VT manages virtual machines launched within the platform 212 and enables a system to simultaneously run different programs or operating systems by machine multiplexing multiple virtual resources onto a single physical resource.

The Hypervisor 204 manages all hardware structures such as the MMU, I/O devices, DMA controllers, etc., to ensure applications or operating systems, when running, have a consistent virtual view of underlying hardware. Thus, LT and VT provide a hardware foundation protecting information from attacks without compromising usability by enabling protected execution, protected input/output (I/O), and sealed storage, which is a combination of measurements and encryption where sealed data is only available (unsealed) when an indicated measurement is present on a Trusted Platform Module (TPM) (see item 206 discussion below). In one embodiment, a "Dom0" special privileged domain (not illustrated) is communicatively coupled with the Hypervisor and provides support for device virtualization and may provide virtual device models to guest domains, including the Service Provider 218 and User Application 220 Domains. It will be appreciated by one skilled in the art Dom0 is a special virtual machine that serves to manage other virtual machines (e.g., create, destroy, migrate, save, restore, etc.) and assign of I/O devices to virtual machines.

For more information on LT and VT, see the LaGrande Technology Architectural Overview available at Internet Uniform Resource Locator (URL) ftp:$$download#intel#com$ technology$security$downloads$LT_Arch_Overview#pdf (with all spaces removed, and all instances of "/" replaced by "$"). See also, for example, the Intel Vanderpool Technology for IA-32 Processors (VT-x) Preliminary Specification at http:$$cache-www#intel#com$cd$00$00$29$76$297666_ 297666#pdf (with all spaces removed, and all instances of "." replaced by "#" and all instances of "/" replaced by "$"). It is assumed the reader is familiar with these technologies. It should be appreciated that LT and VT are provided for exemplary purposes only and other technology may be utilized to implement the principles discussed herein. However, with LT and VT type technology available the trusted nature of the system 200 allows a recipient of location data or other data from the system to assume the data is secure, e.g., it has not been tampered with.

In the illustrated embodiment, the illustrated trusted platform hardware 202 contains a Trusted Platform Module (TPM) 206 in addition to other components such as processors, chipsets, etc. As will be appreciated by one skilled in the art, the TPM is a hardware component designed to enhance platform security by providing a protected space for cryptographic keys and key operations and other security critical tasks. The provides various security related hardware and functions, such as a random number generator for encryption algorithms, storage for cryptographic data and keys (so that keys may securely be stored as plain text), etc. In the illustrated embodiment, the TPM is used to securely sign location data as it leaves the trusted platform hardware so that other hardware or software may be assured received data is secure.

With underlying LT and VT security (or equivalent) and TPM support, we can now introduce the concept of a Trusted Location Service Domain (TLSD) 208. The TLSD mediates requests between hardware and software for location data or other data by coordinating secure data transfer 226 between, for example, Voice over Internet Protocol (VoIP) software and a Trusted Location Provider (TLP) 210 discussed below. As will be discussed, when application software or other hardware requests location information from the TLSD, such as would occur for an outgoing E911 VoIP telephone call, the TLSD obtains a current location from the TLP and bundles it with the outgoing call request. See for example the Session Initiation Protocol Location Conveyance draft-ietf-sip-location-conveyance-02.txt document dated Jul. 27, 2005, which can be obtained at URL http:$$tools#ietf#org$id$ draft-ietf-sip-location-conveyance-02#txt with all spaces removed, and all instances of "." replaced by "#" and all instances of "/" replaced by "$") which explains one exemplary technique for using Session Initiation Protocol (SIP) messages to convey location information along with a telephone call. The TLSD 208 is responsible securely storing location data in the platform 212 for use. The TLSD responds to requests from internal domains as well as external sources, such from external software or hardware communicatively coupled with the platform.

In the illustrated embodiment, the TLSD may have selected ones of a Policy Manager 214 or a Rules Manager 216 to control how location data may be distributed to requesting application software (see, e.g., the User Domain discussion below). For example, when an E911 telephone call is placed, a full-disclosure policy or rule may be defined so no hiding occurs since providing exact information is important in an emergency call. However, under other circumstances, another policy or rule may say that if a call is placed to a business toll-free telephone number, only restricted location data and/or caller identification (ID) data (such as just an areas code or prefix) is provided to the called company without there being an exception rule to allow more data to pass. Rules may define when and/or from where location data may be provided, or to require certain characteristics of a recipient, such as a verifiable security policy associated with the business to show it will not abuse data received from the platform.

The TLSD 208 will interact with several other components of the platform 212 as discussed below, each component is referenced to as a Domain since each may be accessed independently of one another, and as discussed in FIG. 1, each may operate in a protected VM space within a LT, VT, TPM type of framework (or equivalent) discussed above. In the illustrated embodiment, the platform 212 has a Trusted Location Provider (TLP) 210. If the system is applied to solving the E911 problem discussed above, then having reliable location data is needed. The TLP is a hardware or software entity that provides location information to other portions of the platform or (not illustrated) to external requesters. It will be appreciated there are many different location technology options available today, such as using systems intended for position determination use like the Global Positioning System (GPS) which determines location based on satellite signals, or the Long Range Navigation (LORAN) system which determines location based on time displacement of radio signals from multiple known transmitters; location may also be determined based on systems not designed for providing location data, such as by triangulating a position based on one or more of: wired or wireless network access points, cellular tower triangulation, self-identifying sources, e.g., ones whose communication include their location, or communication with devices having discernable locations such as by way of correlation with a service map.

While the illustrated embodiment assumes the TLP 210 determines a location with hardware built-in to the platform 212, it will be appreciated an external third party location determination source (not illustrated) such as an external attached GPS device, may be used. However, reliability of location data depends on the reliability of the technique used to determine the location. Hence, while the trusted platform aspects of the platform 212, e.g., LT, VT, etc. may guarantee location data has not been altered, the data itself may not be reliable. Therefore, in some embodiments, depending on how the location data is determined, associated with the location data is a reliability factor indicating reliability of the utilized location technique. Thus, for example, GPS data would be deemed very reliable, while access point triangulation or an external GPS device would likely not. The reliability factor may also include a determination of probable risk of error in underlying data used to perform the location determination.

For example, time gaps between ability to obtain current location data becomes a factor in the deemed reliability of location data. In one embodiment, dead reckoning or other gap-filler techniques may be used to estimate gaps in location information. When a request for location data is received, immediately an attempt is made to get current location data from the TLP 210; however if the data is unavailable, estimated data may be provided (unless restricted by a policy or rule), but the reliability of the data will be indicted accordingly. Hence, if location data is requested and cannot be determined immediately, then last known location data can be adjusted based on gap filler techniques such as dead reckoning, and provided with a reliability factor based on how much gap filling has occurred since a good location was known.

In the illustrated embodiment, a Service Provider Domain (SPD) 218 provides a protected environment for service providers, such as telephony providers or other providers, to securely run platform services needing availability, security and easy deployment, the latter facilitated by the SPD being a separate domain within the platform 212. In a telephony device, the SPD is where a service provider would implement its VoIP application, and it is where the service provider may define its SIP services, network protocols, and other essential components needed to make the telephony communication work. And, due to the platform 202, 204 security features discussed above, the service provider need not worry that its domain may become corrupted through integration into a platform 212 having other active domains. According to some embodiments, Domains may communicate over a secure inter-Domain communication channel providing for encryption, parameter checking to ensure input values are valid, integrity checking to ensure requests received by the SPD are valid, and the like.

In the illustrated embodiment, to complement the SPD, a User Application Domain (UAD) 220 contains all user-level (or user-installable) applications and operating high-level operating systems (OS) or OS interfaces. The UAD offers a protected environment for Service Providers to run critical platform services that require availability, security, and easy deployment. However, the UAD, by virtue of being left to use by users, it is less controlled than the other Domains, and is more susceptible to attack by malicious code or through poorly configured interfaces. Since this is the domain that the user interacts with directly, user-level storage 222 may be used to store policies or rules (which may be applied along with TLSD policies or rules, see, e.g., items 214, 216) to control location dissemination or other data such as personal or sensitive information, as well as other data such as user preferences, graphical user interfaces, etc. For example, a user could specify a policy or rule that E911 call recipients or certain recipients such as family members receive location information that is accurate as possible, while all other recipients only receive regional geographic information or other information as desired by the user.

Also illustrated is a Data Recipient 224 which is an entity which receives secured data from the platform 212, such as location data derived by the Trusted Location Provider 210. As discussed above, in the exemplary context of an E911 telephone call, the Data Recipient would be a telephony call recipient that is provided the platform's 212 actual current location along with the call initiation data. As discussed above, this location data may also include an indication of the location data's reliability if data from the TLP 210 is not current, either due to inability of the TLP to get current data at the time of the call, or from some other issue resulting in stale location data. On receiving call initiation data, the Data Recipient strips off the location data from the call data and uses it as it deems appropriate, in accordance with the embodiments described herein.

In one embodiment, the platform 212 placing a telephone call may use cryptographic key exchange techniques, public key cryptography, or the like to establish a secure connection between the User Application Domain 220 telephony application, e.g., the VoIP or other software, and the Data Recipient 224. Once this secure connection is established, the telephony application may transfer a hash value or other authentication data to the Data Recipient so that the authenticity of the location data may be determined before the Data Recipient relies on the received data. It will be appreciated that voice data may also be securely transmitted through the secure connection of another such connection to minimize risk of eavesdropping.

Figure 3:
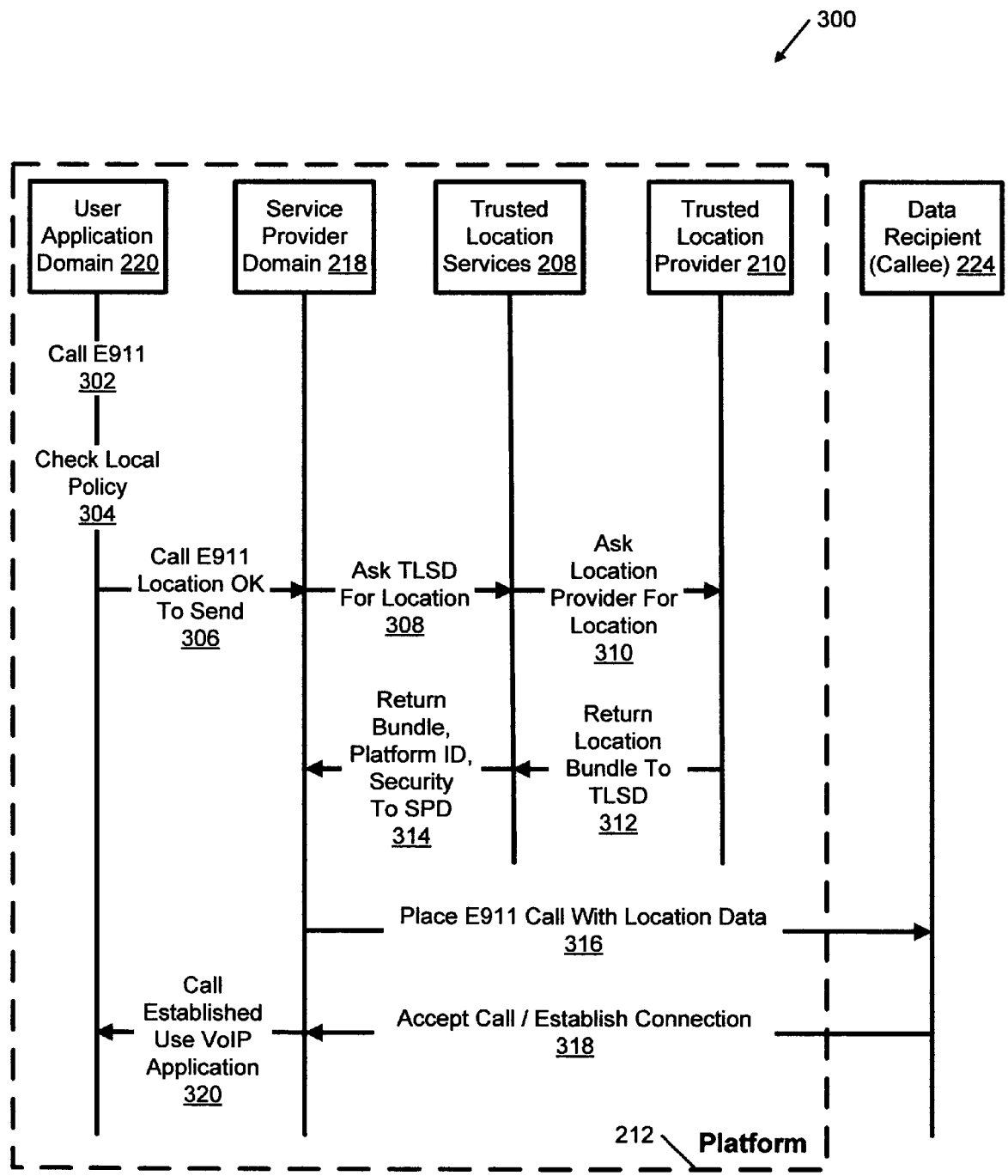
FIG. 3 is a state diagram illustrating a call flow according to one embodiment for a call to an E911 service.

FIG. 3 is a state diagram illustrating a call flow according to one embodiment for a call to an E911 service which requires passing the caller's current location (address, etc.) to the callee. As discussed above, while an E911 call is the primary example used herein to explain operation of the FIG. 2 platform 212, it will be appreciated that the data security techniques disclosed herein are applicable to transferring other data as well. As illustrated, the FIG. 2 the User Application Domain (UAD) 220, Service Provider Domain (SPD) 218, Trusted Location Services (Domain) (TLSD) 208, Trusted Location Provider (TLP) 210 and Data Recipient 224 may intercommunicate to determine a caller's current location when placing a call, and securely pass the location data to a telephony application in the User Application Domain for passage to the Data Recipient, e.g., the E911 callee.

It will be appreciated that the components of the platform 212 may perform other operations in addition to those illustrated. These are simply core operations to illustrate basic operational principles. Hence, a first operation is for a user of the UAD to activate software, such as a VoIP telephony program, to place 302 an E911 call. Note that the platform 212 may be a computer system with a GUI in which the user engages a soft-phone application such as Skype™ (see, e.g., http:$$www#skype#com) (with all spaces removed, and all instances of "." replaced by "#" and all instances of "/" replaced by "$"). or the platform may be integrated within a VoIP telephone adapter, e.g., a device that appears to be a conventional phone but to which is attached a network cable rather than a telephone line, where the VoIP telephone operates as a client of, for example, the Vonage™ network (see, e.g., http:$$vonage#com) (with all spaces removed, and all instances of "." replaced by "#" and all instances of "/" replaced by "$"). Thus, in the former example, placing a call may include clicking on a call button or equivalent in a GUI, and where in the latter example, placing the call may include picking up the telephone receiver and dialing 911 as one would do with a conventional telephone.

After trying to place the call, in some embodiments, the UAD and/or user thereof may have local policies or rules controlling call placement, e.g., restrictions based on time of day, user identity, call pricing, call destination, etc., or controlling data modification to automatically remove personally identifying information to preserve privacy except under certain circumstances, such as placing an emergency call that needs to know your current location. In the illustrated embodiment, assuming checking 304 local policies or rules indicates the callee can receive the caller's location data, the outgoing call request is routed 306 to the SPD with a request that location data be bundled with the call 302.

The Service Provider Domain then requests 308 the platform's current location information from the Trusted Location Services (Domain) 208. As discussed above with respect to FIG. 1, in some embodiments the TLSD mediates requests from Domains for information and manages secure data transfers between the various Domains. In the illustrated embodiment, the TLSD submits 310 a request to the Trusted Location Provider (TLP) for current location information. In one embodiment, the TLP determines a current location data and returns 312 it as a "location bundle" of data including the location data, e.g., geographic coordinates or other position representation data, along with other data to prevent data manipulation such as a replay attack.

This other data may include timestamps, an expiration time for the timestamp, nonces (a one time use unique number that can be derived in part from the location data to make the bundle collectively unique), an identifier of the TLP, and other information to prevent data attacks. In one embodiment, the bundle from the TLP may also include reliability data to provide an indication as to how reliable the TLP believes the location data is. As discussed above, various events or certain sources for location data may suggest the location data is unreliable to some extent. It will be appreciated that a scale used for reliability is arbitrary, e.g., it could simply be on a scale of 1 to 100 where 1 is worst and 100 is deemed entirely reliable. The bundle may be signed by the TLP, e.g., with the FIG. 2 TPM 206, with credentials associated with the TLP.

When the TLSD receives the location bundle from the TLP; it may validate the location bundle if desired to ensure there was no tampering with the data since it was sent by the TLP. The TLSD in turn provides 314 the location bundle to the Service Provider Domain. In the illustrated embodiment, the TLSD modifies the location bundle to include an identifier for the platform 212, and signs the location bundle with the TPM using platform credentials that enable a data recipient, such as a callee 224, to associate the location data provided by the TLP with this particular platform 212.

After the Service Provider Domain receives 314 the location bundle signed by the TLSD, it deconstructs the location bundle to pull out, for example, the location data provided by the TLP and the platform ID determined by the TLSD. The SPD then initiates the requested 306 call and re-bundles the location data, platform ID with the call invite sent 316 to the Data Recipient. For the purposes of this illustrated embodiment, the SPD utilizes the Jul. 27, 2005 Session Initiation Protocol Location Conveyance IETF draft extension to the SIP for conveying location information to the Data Recipient, e.g., the callee. Based on the embodiments described herein, one of ordinary skill in the relevant art(s) would appreciate how other extensions may be used to convey location/source information.

When the Data Recipient receives the bundle from the SPD, the Data Recipient checks the validity of the TPM signature on the data bundle, and checks the location coordinates by verifying they were signed by credentials associated with the TLP. Assuming the cryptographic review indicates there was no tampering with the data determined by the TLP when the call was initiated 302, the Data Recipient can rely on the data being accurate and, with knowledge of the caller's current location, accept/establish 318 the call 306 from the Service Provider Domain's telephony application.

Figure 4:
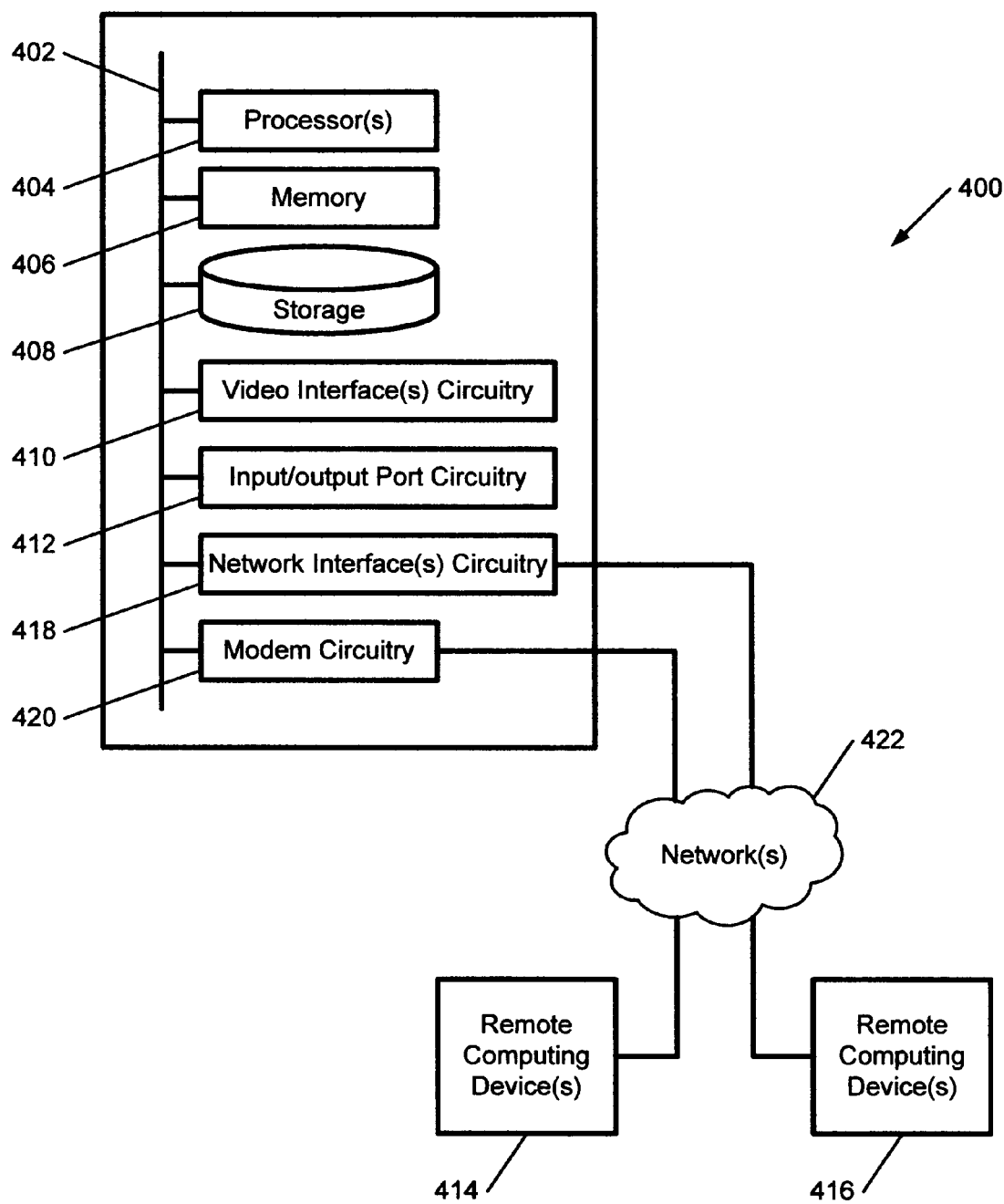
FIG. 4 illustrates a suitable computing environment in which certain aspects of the invention may be implemented.

FIG. 4 and the following discussion are intended to provide a brief, general description of a suitable environment in which certain aspects of the illustrated invention may be implemented. As used herein below, the term "machine" is intended to broadly encompass a single machine, or a system of communicatively coupled machines or devices operating together. Exemplary machines include computing devices such as personal computers, workstations, servers, portable computers, handheld devices, e.g., Personal Digital Assistant (PDA), telephone, tablets, etc., as well as transportation devices, such as private or public transportation, e.g., automobiles, trains, cabs, etc.

Typically, the environment includes a machine 400 that includes a system bus 402 to which is attached processors 404, a memory 406, e.g., random access memory (RAM), read-only memory (ROM), or other state preserving medium, storage devices 408, a video interface 410, and input/output interface ports 412. The machine may be controlled, at least in part, by input from conventional input devices, such as keyboards, mice, etc., as well as by directives received from another machine, interaction with a virtual reality (VR) environment, biometric feedback, or other input source or signal.

As discussed above with respect to FIG. 2, the machine may be configured to support Intel's LaGrande Technology™ (LT) and Vanderpool Technology (VT) and include a Trusted Platform Module (TPM). As appreciated by one skilled in the art, the TPM includes hardware and supporting software and firmware providing a platform root of trust with ability to extend trust to other platform components by building a chain of trust. The TPM can be viewed as a secure micro-controller with cryptographic functionalities allowing cryptographic functions to be executed within TPM hardware. Hardware and software outside of the TPM do not have access to the execution of cryptographic functions within the TPM hardware, and hence can only provide input/output for the TPM.

The machine may include embedded controllers, such as programmable or non-programmable logic devices or arrays, Application Specific Integrated Circuits, embedded computers, smart cards, and the like. The machine may utilize one or more connections to one or more remote machines 414, 416, such as through a network interface 418, modem 420, or other communicative coupling. Machines may be interconnected by way of a physical and/or logical network 422, such an intranet, the Internet, local area networks, and wide area networks. One skilled in the art will appreciated that communication with network 422 may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

While some aspects of the machine may be implemented with dedicated hardware components, it will be appreciated the invention may be described by reference to or in conjunction with associated data such as functions, procedures, data structures, application programs, etc. which when accessed by one or more processors of the machine results in the machine performing tasks or defining abstract data types or low-level hardware contexts. Associated data may be stored in, for example, volatile and/or non-volatile memory 406, or in storage devices 408 and/or associated storage media, including conventional hard-drives, floppy-disks, optical storage, tapes, flash memory, memory sticks, digital video disks, etc., as well as more exotic mediums such as machine-accessible biological state preserving storage. The term 'non-transitory tangible machine readable medium' shall accordingly include, but not be limited to memory 406 and storage devices 408. Associated data may be used in a compressed or encrypted format, and may be delivered over transmission environments, including network 422, in the form of packets, serial data, parallel data, propagated signals, etc. and which may be stored in a tangible medium for access by the machine. Associated data may be used in a distributed environment, and stored locally and/or remotely for access by single or multi-processor machines. Associated data may be used by or in conjunction with embedded controllers; in the claims that follow, the terms "circuitry" or "logic" is intended to refer generally to possible combinations of associated data and/or embedded controllers.

Thus, for example, with respect to the illustrated embodiments, assuming machine 400 embodies the FIG. 2 platform 212, then remote machines 414, 416 may respectively be the FIG. 2 Trusted Location Provider 210, assuming the source for geographic data is external to the TLP (recall this may make the data less reliable), and the FIG. 2 telephony Data Recipient 224. It will be appreciated that remote machines 414, 416 may be configured like machine 400, and therefore include many or all of the elements discussed for machine.

Having described and illustrated the principles of the invention with reference to illustrated embodiments, it will be recognized that the illustrated embodiments can be modified in arrangement and detail without departing from such principles. And, though the foregoing discussion has focused on particular embodiments, other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto.

What is claimed is:

1. A machine comprising:
   a first virtual machine configured to host at least an application domain, wherein the application domain includes a telephony application configured to request a location provider for a current location of the machine and send the current location along with outbound phone calls placed by the telephony application, wherein the machine is configured for mobile usage;
   a second virtual machine configured to host at least the location provider configured to determine the current location of the mobile machine;
   a domain mediator configured to mediate access to the location provider over an inter-domain communication channel coupling the application domain and the location provider, including securely providing location data from the location provider to the application domain; and
   a trusted platform module configured to communicatively couple selected ones of: the application domain and the location provider, wherein the trusted platform module is further configured to cryptographically secure location data transmitted between said coupled ones of the application domain and location provider.

2. The machine of claim 1, wherein the trusted platform module is configured to sign location data determined by the location provider.

3. The machine of claim 2,
   wherein the location provider is configured to determine the location data, sign the determined location data with the trusted platform module, and send the signed location data to the domain mediator, and
   wherein the domain mediator is configured to secondarily sign the location data with the trusted platform module and provide the doubly signed location data to the application domain.

4. The machine of claim 1, further comprising selected ones of:
   a user storage in the application domain configured to store at least user policies or rules constraining performing tasks, wherein the telephony application is configured to review the policies or rules to confirm availability of performing a telephony task;
   a policy manager component of the domain mediator configured to modify data mediated by the domain mediator in accord with platform administrator policies; or
   a rules manager component of the domain mediator configured to modify data mediated by the domain mediator in accord with platform administrator policies.

5. The machine of claim 1, further comprising:
a user storage in the application domain configured to store at least rules constraining performing tasks, said rules including a privacy rule requiring modifying location data;
wherein the telephony application is configured to review said rules to confirm availability of performing initiating a telephony connection and to modify the location data as needed in accord with the privacy rule.

6. The machine of claim 1, further comprising a virtual machine manager configured to provide the communication channel.

7. The machine of claim 1, further comprising a global positioning system (GPS) component configured to provide the current location, wherein the GPS component is communicatively coupled to the location provider of the second virtual machine.

8. The machine of claim 1, wherein the location provider is further configured to provide a reliability factor to indicate a confidence in the current location.

9. A method for using a mobile machine having a first virtual machine hosting an application domain including a telephony application, a second virtual machine hosting a location provider to determine a current location of the mobile machine, and a domain mediator to mediate access to the location provider, comprising:
receiving a request to initiate a call, by the telephony application, and responsive thereto, requesting by the telephony application from the domain mediator the current location of the mobile machine provided by the location provider;
applying, by the location provider, a first cryptographic security to the location data to facilitate identifying tampering with the location data; and
modifying, by the domain mediator, the location data with the first cryptographic security in accordance with platform administrator policy and applying a second cryptographic security to facilitate determining tampering with the modified location data;
receiving from the domain mediator, by the telephony application, signed location data identifying the current location of the mobile machine, the location data being signed by selected ones of the location provider and the domain mediator;
validating the location data has not been tampered with, by the telephony application, based at least in part on said signing by the selected ones of the location provider and domain mediator; and
initiating the call, by the telephony application, and providing at least a portion of the current location of the mobile machine along with the call.

10. The method of claim 9, further comprising modifying, by the telephony application, the location data as needed in accord with a user privacy policy.

11. The method of claim 9, further comprising determining, by the telephony application, whether the location data was altered after being provided by the location provider.

12. The method of claim 9, further comprising:
cryptographically signing the location data, by a trusted platform module disposed within the machine.

13. The method of claim 9, further comprising signing by selected ones of the location provider and domain mediator, including:
the location provider determining the location data and first signing it; and
the domain mediator secondarily signing the location data with a trusted platform module and providing the doubly signed location data to the application domain.

14. The method of claim 9, further comprising the telephony application reviewing policies or rules stored in a user storage in the application domain to confirm availability of performing a telephony task prior to performing said task.

15. The method of claim 9, further comprising the telephony application reviewing policies or rules stored in a user storage associated with the application domain to confirm availability of performing a telephony task.

16. The method of claim 15, further comprising:
determining, by the telephony application, whether a user privacy rule requires modifying location data; and
modifying, by the telephony application, the location data as needed in accord with the user privacy rule.

17. An article of manufacture comprising a non-transitory tangible machine-readable medium having one or more associated instructions store thereon configured to program a mobile machine and enable the mobile machine, in response to execution of the instructions by the mobile machine, to perform operations including:
receiving a request to initiate a call, by a telephony application located in a first virtual machine of the mobile machine, and responsive thereto, requesting by the telephony application, from a domain mediator of the mobile machine, the current location of the mobile machine, provided by a location provider of a second virtual machine, the domain mediator mediating access to the location provider;
receiving, by the telephony application, from the domain mediator a doubly signed location data identifying the current location of the mobile machine, the location data being first signed by the location provider and second signed by the domain mediator;
applying, by the location provider, a first cryptographic security to the location data to facilitate identifying tampering with the location data; and
modifying, by the domain mediator, the location data with the first cryptographic security in accordance with platform administrator policy and applying a second cryptographic security to facilitate determining tampering with the modified location data;
validating the location data has not been tampered with, by the telephony application, based at least in part on selected ones of the first signature and the second signature; and
initiating the call, by the telephony application, including providing at least a portion of the current location of the mobile machine along with a call.

18. The article of claim 17, wherein the operations further include modifying, by the telephony application, the location data as needed in accord with a user privacy policy.

19. The article of claim 17, wherein the operations further include determining, by the telephony application, the location data was altered after being provided by the location provider.

20. The article of claim 17, wherein the operations further include cryptographically signing the location data with a trusted platform module disposed within the mobile machine.

21. The article of claim 17, wherein the operations further include the telephony application reviewing policies or rules stored in a user storage in the application domain to confirm availability of performing a telephony task prior to performing said task.

22. The article of claim 17, wherein the operations further include:
determining, by the telephony application, whether a user privacy rule requires modifying location data; and
modifying, by the telephony application, the location data as needed in accord with the user privacy rule.

* * * * *